(12) United States Patent
Polaganga et al.

(10) Patent No.: US 12,342,179 B2
(45) Date of Patent: *Jun. 24, 2025

(54) SPECTRUM MANAGEMENT FOR DSS-BASED NETWORKS

(71) Applicant: T-Mobile Innovations LLC, Overland Park, KS (US)

(72) Inventors: Roopesh Kumar Polaganga, Bothell, WA (US); Sreekar Marupaduga, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 106 days.

This patent is subject to a terminal disclaimer.

(21) Appl. No.: 18/323,570

(22) Filed: May 25, 2023

(65) Prior Publication Data

US 2023/0300627 A1    Sep. 21, 2023

Related U.S. Application Data

(63) Continuation of application No. 17/335,278, filed on Jun. 1, 2021, now Pat. No. 11,700,535.

(51) Int. Cl.
*H04L 12/28* (2006.01)
*H04W 16/10* (2009.01)
*H04W 16/14* (2009.01)
*H04W 28/20* (2009.01)
*H04W 72/0453* (2023.01)
*H04J 1/16* (2006.01)

(52) U.S. Cl.
CPC ........... *H04W 16/14* (2013.01); *H04W 16/10* (2013.01); *H04W 28/20* (2013.01); *H04W 72/0453* (2013.01)

(58) Field of Classification Search
CPC ..... H04W 16/10; H04W 16/14; H04W 28/20; H04W 72/0453; H04W 16/04
USPC .......................................... 370/252, 329, 430
See application file for complete search history.

(56) References Cited

U.S. PATENT DOCUMENTS

| 8,934,499 | B1 * | 1/2015 | Shetty ................. H04B 7/0686 |
| | | | 370/437 |
| 9,445,278 | B2 * | 9/2016 | Sadek .................... H04W 16/14 |
| 10,051,506 | B1 * | 8/2018 | Mistry .................. H04L 47/822 |
| 10,548,114 | B2 | 1/2020 | Hassan et al. |
| 2013/0230019 | A1 | 9/2013 | Manssour et al. |
| 2015/0296384 | A1 | 10/2015 | Sadek |

(Continued)

FOREIGN PATENT DOCUMENTS

WO    2020/190195 A1    9/2020

*Primary Examiner* — John Pezzlo
(74) *Attorney, Agent, or Firm* — Jones Robb, PLLC

(57) ABSTRACT

A system and method of managing network bandwidth is provided, in which one or more utilization thresholds are set for an access node, wherein the access node is configured to communicate using a band consisting of a first portion corresponding to communication in a first communication mode and a second communication mode and a second portion corresponding to communication in the first communication mode but not the second communication mode; and one or more utilization parameters are monitored and compared to the corresponding utilization threshold(s). Based on the comparison, the sizes of the portions may be modified and/or wireless devices seeking to join the network may be appropriately assigned.

20 Claims, 7 Drawing Sheets

(56) References Cited

U.S. PATENT DOCUMENTS

| | | |
|---|---|---|
| 2017/0142742 A1 | 5/2017 | Fischer et al. |
| 2021/0243609 A1* | 8/2021 | Lei ..................... H04L 5/0048 |
| 2022/0311586 A1* | 9/2022 | Vadapalli .......... H04W 72/0446 |
| 2023/0072769 A1* | 3/2023 | Yeh ................... H04W 28/0858 |
| 2023/0199851 A1* | 6/2023 | Mukherjee ........ H04W 74/0808 370/329 |
| 2023/0239705 A1* | 7/2023 | Gronstad ............. H04W 16/10 370/329 |

* cited by examiner

SPECTRUM MANAGEMENT FOR DSS-BASED NETWORKS

This patent application is a continuation of U.S. patent application Ser. No. 17/355,278, filed on Jun. 1, 2021, which is incorporated by reference in its entirety for all purposes.

TECHNICAL BACKGROUND

A wireless network, such as a cellular network, can include an access node (e.g., a base station) serving multiple wireless devices or user equipment (UE) in a geographical area covered by a radio frequency transmission provided by the access node. Different carriers or carrier divisions within the cellular network may utilize different types of radio access technologies (RATs). RATs can include, for example, 3G RATs such as Global System for Mobile Communications (GSM), Code-Division Multiple Access (CDMA), etc.; 4G RATs such as Worldwide Interoperability for Microwave Access (WiMAX), Long Term Evolution (LTE), etc.; and 5G RATs such as new radio (NR).

As RAT adoption transitions to newer technologies (e.g., as more consumers replace 4G devices with 5G devices), some network providers elect to accommodate the changing usage parameters by repurposing spectrum dedicated to older RATs for newer RATs. In one example, consider a network provider whose customers initially own many LTE devices and fewer NR devices. At this time, the provider may elect to dedicate a large majority of spectrum to LTE communication and a small part of spectrum to NR section. However, as a provider's customers own more NR devices (and fewer LTE devices), the provider may, at times, remove a portion of LTE spectrum and reassign it as NR spectrum.

In view of the limited spectrum available to many network providers, some providers allow multiple different RATs to coexist on the same spectrum. In some implementations, a predetermined set of frequency bands of spectrum may be divided into portions serving the different RATs in advance. For example, a 100 megahertz (MHz) block of bandwidth may be divided into a static 40 MHz portion for a first RAT and a static 60 MHz portion for a second RAT. However, some providers implement a Dynamic Spectrum Sharing (DSS) scheme to share a predetermined set of frequency bands with both LTE and NR RATs. Under the DSS scheme, the divisions within the frequency bands may be dynamically varied based on various factors (e.g., RAT adoption). Spectrum sharing schemes may generally permit newer RATs such as NR to utilize existing infrastructure such as LTE sites and/or existing bands such as low-frequency (<3 gigahertz (GHz)) bands.

Overview

Various aspects of the present disclosure relate to systems and methods of managing network resources.

In one exemplary aspect of the present disclosure, a method of managing network resources comprises: setting a first utilization threshold and a second utilization threshold for an access node, wherein the access node is configured to communicate using a band consisting of a first portion corresponding to communication in a first communication mode and a second communication mode and a second portion corresponding to communication in the first communication mode but not the second communication mode; monitoring a first utilization parameter for the first portion of the band; monitoring a second utilization parameter for the second portion of the band; comparing the first utilization parameter to the first utilization threshold and the second utilization parameter to the second utilization threshold; and in response to a determination that the first utilization parameter exceeds the first utilization threshold and that the second utilization parameter does not exceed the second utilization threshold, increasing a size of the first portion and decreasing a size of the second portion by an equal amount.

In another exemplary aspect of the present disclosure, a system for managing network resources comprises: an access node configured to communicate using a band consisting of a first portion corresponding to a first communication mode and a second communication mode and a second portion corresponding to only the first communication mode; and at least one electronic processor configured to perform operations including: setting a utilization threshold for an access node, monitoring a utilization parameter for the first portion of the band, comparing the utilization parameter to the utilization threshold, and based on the comparing, modifying a size of the first portion and a size of the second portion.

In another exemplary aspect of the present disclosure, a method of managing network resources comprises: setting a utilization threshold for an access node, wherein the access node is configured to communicate using a band consisting of a first portion corresponding to communication in a first communication mode and a second communication mode and a second portion corresponding to communication in the first communication mode but not the second communication mode; monitoring a utilization parameter for the first portion of the band; receiving a join request from a wireless device, wherein the wireless device is capable of communicating in both of the first communication mode and the second communication mode; comparing the utilization parameter to the utilization threshold; and in response to a determination that the utilization parameter exceeds the utilization threshold, assigning the wireless device to communicate using the second portion of the band.

In this manner, these and other aspects of the present disclosure provide for improvements in at least the technical field of telecommunications, as well as the related technical fields of network management, device management, wireless communications, and the like.

This disclosure can be embodied in various forms, including hardware or circuits controlled by computer-implemented methods, computer program products, computer systems and networks, user interfaces, and application programming interfaces; as well as hardware-implemented methods, application specific integrated circuits, field programmable gate arrays, and the like. The foregoing summary is intended solely to provide a general idea of various aspects of the present disclosure, and does not limit the scope of the disclosure in any way.

BRIEF DESCRIPTION OF THE DRAWINGS

These and other more detailed and specific features of various embodiments are more fully disclosed in the following description, reference being had to the accompanying drawings, in which.

DETAILED DESCRIPTION

Figure 1:
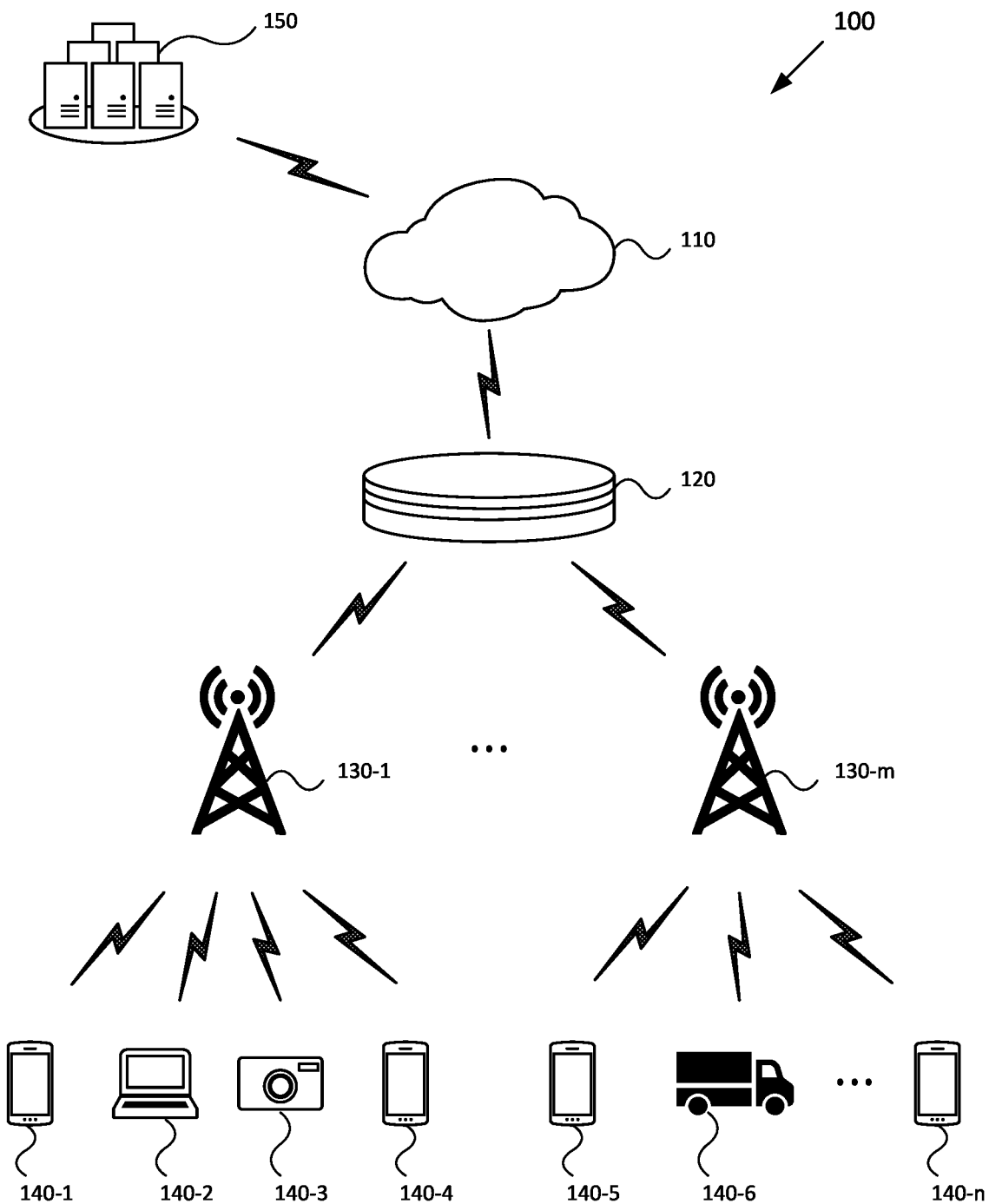
FIG. 1 illustrates an exemplary system according to various aspects of the present disclosure.

In the following description, numerous details are set forth, such as flowcharts, schematics, and system configurations. It will be readily apparent to one skilled in the art that these specific details are merely exemplary and not intended to limit the scope of this application.

In accordance with various aspects of the present disclosure, a cellular or wireless network may be provided by an access node. The access node may utilize one or more antennas to communicate with wireless devices or UEs. These UEs may be configured for communication using 4G RATs such as LTE and/or 5G RATs such as NR. At present, there are many more LTE-capable UEs than there are NR-capable UEs; however, it is expected that the proportion of UEs that are NR-capable will increase.

To facilitate migration from LTE to NR, for example, some network providers may implement static or dynamic spectrum sharing schemes. Under a static scheme, a predetermined set of frequency bands of spectrum may be divided into portions serving the different RATs in advance. For example, a 100 MHz block of bandwidth may be divided into a static 40 MHz portion for a first RAT and a static 60 MHz portion for a second RAT. Under a dynamic (DSS) scheme, the divisions within the frequency bands may be dynamically varied based on various factors (e.g., RAT adoption). The remaining (non-DSS) frequency bands may be dedicated to either LTE or NR users depending on, for example, the traffic profile.

While both types of schemes permit the coexistence of LTE-capable UEs and NR-capable UEs on the same frequency bands, dynamic (DSS) schemes may provide for more rapid reallocation in response to changes in RAT uptake and/or more efficient utilization of spectrum. Comparative implementations of sharing schemes define the DSS portion of spectrum (and thus the remaining non-DSS portion) manually and do not have the flexibility to dynamically expand and reduced the DSS portion of spectrum. Thus, even as traffic profiles vary, the comparative implementations are incapable of responding to the variations.

In one example, consider a spectrum having 100 MHz of bandwidth, segmented into ten 10 MHz blocks. A network operator may manually define a first subset of the spectrum (e.g., two blocks) as a DSS portion while dedicating the remainder of the spectrum for LTE users due to LTE's large user base. If NR traffic gradually increases over time, the traffic from the NR devices may easily get congested within the two DSS blocks while the remaining eight dedicated LTE blocks become underutilized as more users transition to NR-capable devices. The comparative implementations do not allow for the dynamic expansion of shared bandwidth beyond the two blocks to accommodate the increase in NR usage. Similarly, if the eight dedicated LTE blocks are heavily congested while the two DSS blocks are underutilized with less NR traffic (e.g., if a particular network cell is in an area of slow or low 5G uptake), the comparative implementations do not allow for the dynamic reduction of shared bandwidth below the two blocks and thereby waste signaling overhead on (nonexistent) NR users. Therefore, there exists a need to dynamically expand and reduce DSS cell bandwidth or usage based on RAT usage characteristics.

Thus, various aspects of the present disclosure may operate in a cellular network utilizing multiple RATs, such as 4G LTE and 5G NR. By providing a system and method to dynamically expand and reduce DSS cell bandwidth or usage based on RAT usage characteristics, the present disclosure may improve the NR and LTE user experiences based on traffic profiles, provide better network resource utilization for both NR and LTE RATs, and so on.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include a UE or end-user wireless device that communicates with the access node directly without being relayed by a relay node. Additionally, "wireless device" may encompass any type of wireless device, such as sensors that may be connected to a network as an IoT device.

Examples described herein may include at least an access node (or base station), such as an Evolved Node B (eNodeB) or a next-generation Node B (gNodeB), and one or a plurality of end-user wireless devices; however, the present disclosure is not limited to such a configuration. Various aspects of the present disclosure may also be applied to communication between an end-user wireless device and other network resources, such as relay nodes, controller nodes, antennas, and so on. Moreover, multiple access nodes may be utilized. For example, some wireless devices in the network may communicate with an LTE eNodeB, while others may communicate with an NR gNodeB.

In addition to the particular systems and methods described herein, the operations described herein may be implemented as computer-readable instructions or methods, and a processing node or nodes on the network for executing the instructions or methods. The processing node or nodes may include a processor included in the access node and/or a processor included in any controller node in the wireless network that is coupled to the access node. Embodiments disclosed herein operate in a network supporting multiple RATs; for example, both LTE and NR communication.

FIG. 1 illustrates an exemplary system 100 for use with various aspects of the present disclosure. As illustrated, the system 100 includes a cloud platform 110, a core network 120, and a plurality of access nodes 130-1 to 130-*m* (collectively referred to as access nodes 130), and a plurality of wireless devices 140-1 to 140-*n* (collectively referred to as wireless devices 140). Other computing systems and devices 150 may be connected to the cloud platform 110, for example to monitor and/or control the wireless devices 140. While FIG. 1 illustrates only two of the access nodes 130, in practical implementations any number of the access nodes 130 (including one) may be present in the system 100. Moreover, while FIG. 1 illustrates seven of the wireless devices 140 and illustrates various subsets of the wireless devices 140 being connected to individual ones of the access nodes 130, the present disclosure is not so limited. In practical implementations, any number of the wireless devices 140 (including zero or one) may be present in total, and any number of such wireless devices 140 (including zero or one) may be connected to each access node 130. As illustrated, various elements of FIG. 1 are connected to one another via wireless connections; however, some of the connections may be wired connections. For example, an access node 130 may be connected to the core network 120 via a wired connection.

The cloud platform 110 may perform processing and forward results to the computing systems and devices 150 and/or the wireless devices 140. The core network 120 connects with the cloud platform 110 and the access nodes 130. For LTE communication, the core network 120 may be implemented on a fixed-function, hard-wired architecture. For 5G communication, the core network 120 may be delivered through a set of interconnected network functions (NFs), individual ones of which are able to access the services of the other NFs in the core network 120. Examples of the core network 120 and/or the access nodes 130 will be described in more detail below with respect to FIGS. 2-3B.

The wireless devices 140 are devices configured with appropriate technologies for connecting to the cloud platform 110. The wireless devices 140 may be or include mobile communication devices such as smartphones, laptop computers, tablet computers, and the like; or vehicles such as cars, trucks, and the like. Examples of the wireless devices 140 and their methods of communicating will be described in more detail below with respect to FIGS. 2-3B. One or more of the access nodes 130 and one or more of the wireless devices 140 may be configured to operate using LTE and NR, thereby to implement a multi-RAT system utilizing the same physical equipment.

Figure 2:
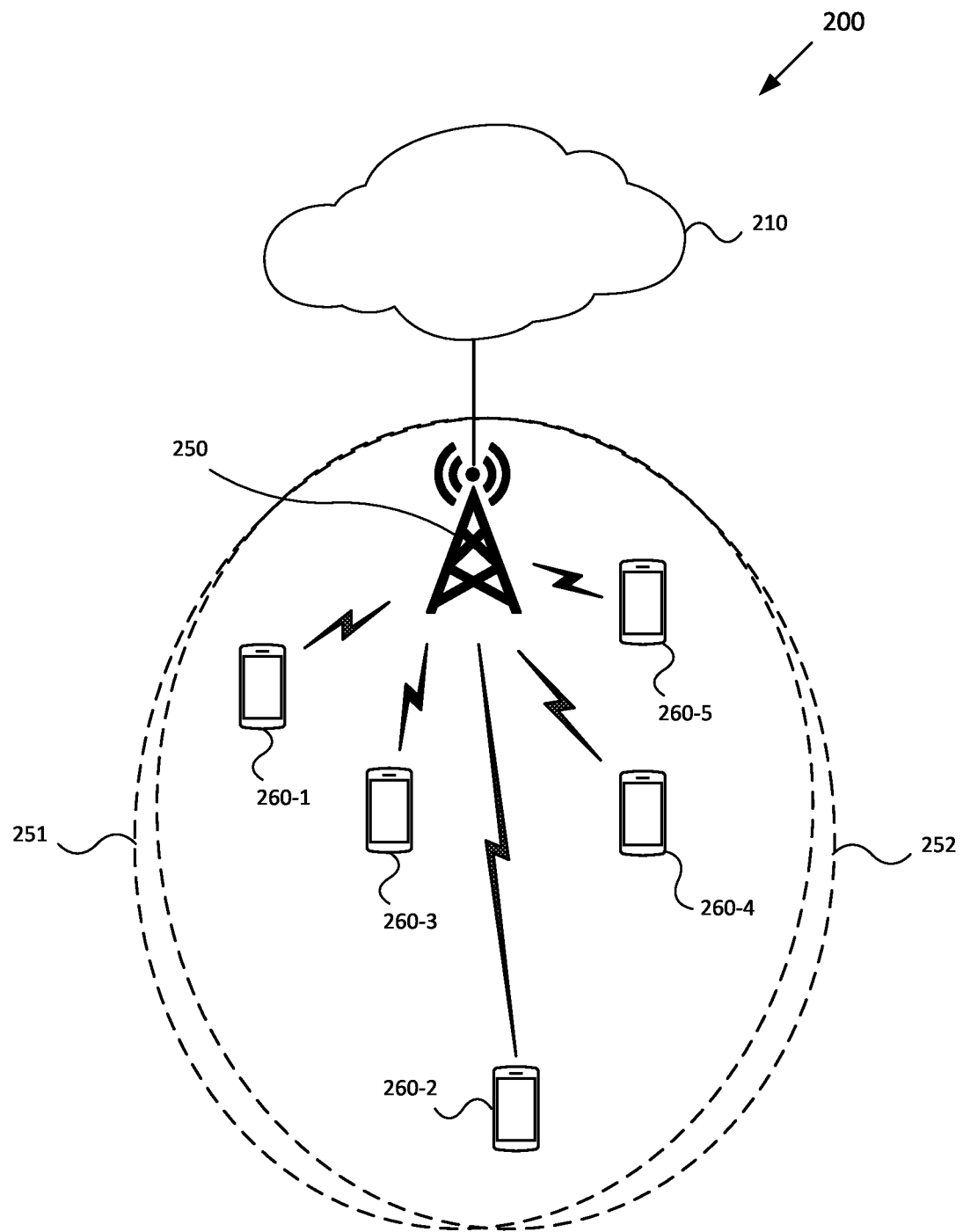
FIG. 2 illustrates an exemplary system configuration according to various aspects of the present disclosure.

FIG. 2 illustrates a configuration for an exemplary system 200 in accordance with various aspects of the present disclosure. As illustrated, the system 200 comprises a communication network infrastructure 210, an access node 250, and a plurality of wireless devices 260-1 to 260-5 (collectively referred to as wireless devices 260). For purposes of illustration and ease of explanation, only one access node 250 is shown; however, as noted above with regard to FIG. 1, additional access nodes 250 may be present in the system 200. While five wireless devices 260 are shown for purposes of explanation, in practical implementations, any number of the wireless devices 260 (including zero or one) may be present at any given time.

Figure 3A:
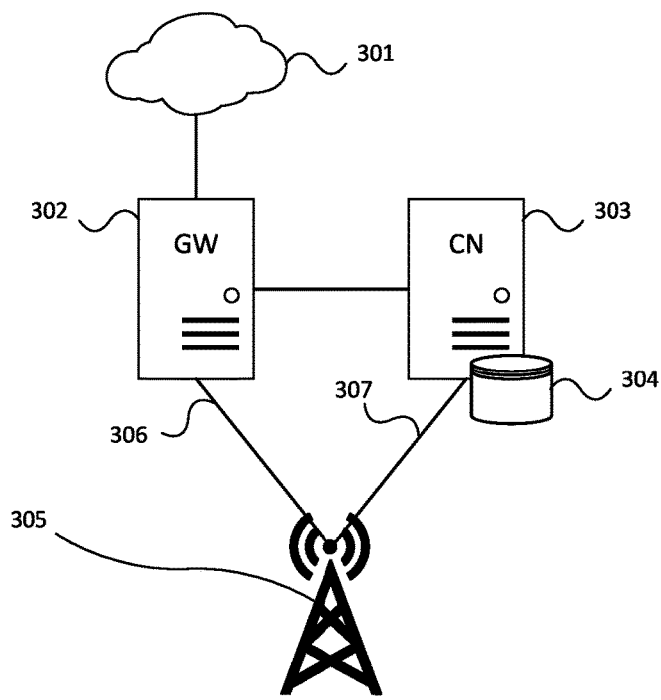
FIGS. 3A and 3B respectively illustrate exemplary network infrastructure according to various aspects of the present disclosure.
Figure 3B:
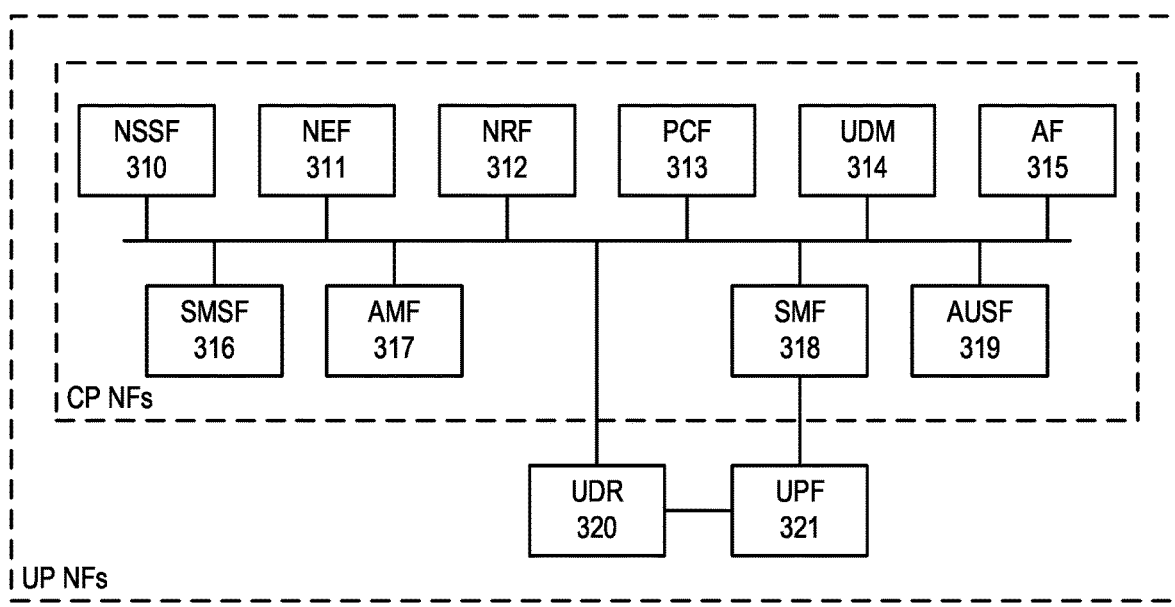

The communication network infrastructure 210 may include components to provide communication via both LTE and NR RATs. FIG. 3A illustrates an exemplary communication infrastructure which may be used to implement LTE communication, and FIG. 3B illustrates an exemplary communication infrastructure which may be used to implement NR communication. For purposes of explanation, FIG. 3A is illustrated in terms of physical components whereas FIG. 3B is illustrated in terms of NFs. In practical implementation, the communication network infrastructure 210 may include all of the components illustrated in both of FIGS. 3A and 3B in any physical combination.

FIG. 3A illustrates a communication network 301, a gateway node 302, a controller node 303 which includes a database 304, and an access node 305 (which may be the same as or similar to the access node 250 illustrated in FIG. 3A. The access node 305 communicates with the gateway node 302 and the controller node 303 via communication links 306 and 307, respectively.

The communication network 301 can be a wired and/or wireless communication network, and can comprise processing nodes, routers, gateways, and physical and/or wireless data links for carrying data among various network elements, including combinations thereof, and can include a local area network (LAN) or a wide area network (WAN), and an internetwork (including the Internet). The communication network 301 can be capable of carrying data, for example to support voice, push-to-talk (PTT), broadcast video, and/or data communications by wireless devices such as the wireless devices 260 of FIG. 2. Wireless network protocols can comprise Multimedia Broadcast Multicast Services (MBMS), CDMA, 1×RTT, GSM, UMTS, High Speed Packet Access (HSPA), Evolution-Data Optimised (EV-DO), EV-DO rev. A, 3GPP LTE, WiMAX, 4G including LTE Advanced and the like, and 5G including 5G NR or 5G LTE, or combinations thereof. Wired network protocols that may be utilized by the communication network 301 comprise Ethernet, Fast Ethernet, Gigabit Ethernet, Local Talk (e.g., Carrier Sense Multiple Access with Collision Avoidance), Token Ring, Fiber Distributed Data Interface (FDDI), and Asynchronous Transfer Mode (ATM). The communication network 301 may also comprise additional base stations, controller nodes, telephony switches, internet routers, network gateways, computer systems, communication links, other types of communication equipment, and combinations thereof.

The gateway node 302 may be any network node configured to interface with other network nodes using various protocols. The gateway node 302 can communicate user data over the system. The gateway node 302 may be a standalone computing device, computing system, or network component, and can be accessible by, for example, a wired or wireless connection, or through an indirect connection such as via a computer network or communication network. The gateway node 302 may include but is not limited to a serving gateway (SGW) and/or a public data network gateway (PGW). Additionally or alternatively, the gateway node 302 may include user plane NFs, such as some or all of those described below with regard to FIG. 3B. The gateway node 302 is not limited to any specific technology architecture, such as LTE or NR, but may be used with any network architecture and/or protocol.

The gateway node 302 can comprise a processor and associated circuitry to execute or direct the execution of computer-readable instructions to obtain information. In so doing, the gateway node 302 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the gateway node 302 can receive instructions and other input at a user interface.

The controller node 303 may be any network node configured to communicate and/or control information over the system. The controller node 303 may be configured to transmit control information associated with resource usage thresholds and/or usage parameters. The controller node 303 may be a standalone computing device, computing system, or network component, and can be accessible by, for example, a wired or wireless connection, or through an indirect connection such as via a computer network or communication network. The controller node 303 may include but is not limited to a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, and the like. Additionally or alternatively, the controller node 303 may comprise user plane NFs and/or control plane NFs, such as some or all of those described below with regard to FIG. 3B. The controller node 303 is not limited to any specific technology architecture, such as LTE or 5G NR, but may be used with any network architecture and/or protocol.

The controller node 303 can comprise a processor and associated circuitry to execute or direct the execution of computer-readable instructions to obtain information. In so doing, the controller node 303 can retrieve and execute software from storage, which can include a disk drive, a flash drive, memory circuitry, or some other memory device, and which may be local or remotely accessible. As illustrated in FIG. 3A, the controller node 303 includes the database 304 for storing information, such as predetermined resource usage thresholds utilized for dynamically managing RATs of the wireless devices 260 of FIG. 2, as well as positions and/or characteristics of the wireless devices 260. The database 304 may further store handover thresholds, scheduling schemes, and resource allocations for the access node 305, the wireless devices 260, and so on. This information may be requested or shared with the access node 305 via the communication link 307, X2 connections, and the like. The software may comprise computer programs, firmware, or some other form of machine-readable instructions, and may include an operating system, utilities, drivers, network interfaces, applications, or some other type of software, including combinations thereof. Moreover, the controller node 303 can receive instructions and other input at a user interface.

The communication links 306 and 307 may respectively use various communication media, such as air, space, metal, optical fiber, other signal propagation paths, and combinations thereof. The communication links 306 and 307 may respectively be wired or wireless and use various communication protocols such as Internet, Internet protocol (IP), LAN, optical networking, hybrid fiber coax (HFC), telephony, T1, other communication formats, and combinations, improvements, or variations thereof. Wireless communication links may use electromagnetic waves in the radio frequency (RF), microwave, infrared (IR), or other wavelength ranges, and may use a suitable communication protocol, including but not limited to MBMS, CDMA, 1×RTT, GSM, UMTS, HSPA, EV-DO, EV-DO rev. A, 3GPP LTE, WiMAX, 4G including LTE Advanced and the like, and 5G including 5G NR or 5G LTE, or combinations thereof. The communication links 306 and 307 may respectively be a direct link or might include various equipment, intermediate components, systems, and networks. The communication links 306 and 307 may comprise many different signals sharing the same link.

FIG. 3B illustrates control plane NFs, including a Network Slice Selection Function (NSSF) 310, a Network Exposure Function (NEF) 311, a NF Repository Function (NRF) 312, a Policy Control Function (PCF) 313, a Unified Data Management (UDM) 314, an Application Function (AF) 315, a Short Message Service Function (SMSF) 316, a Core Access and Mobility management Function (AMF) 317, a Session Management Function (SMF) 318, an Authentication Server Function (AUSF) 319; and user plane NFs, including a Unified Data Repository (UDR) 320 and a User Plane Function (UPF) 321.

While FIG. 3B illustrates several control plane NFs, in practical implementations more or fewer control plane NFs may be provided. Control plane NFs can provide one or more NF based on a request-response or subscribe-notify model. The NFs illustrated in FIG. 3B form a micro services-based architecture, which may include network functions distributed over different cloud infrastructures. Additionally, many services may span different network functions and domains that work in unison.

The NRF 312 maintains the list of available network functions and their profiles. The NRF 312 maintains an updated repository of the network components along with services provided by each of the elements in the core network. The NRF 312 additionally provides a discovery mechanism that allows the elements to discover each other. The NRF 312 provides a registration function that allows each network function to register a profile and a list of services with the NRF 312. It also performs services registration and discovery so that different network functions can find each other. As one example, the SMF 318, which is registered to NRF 312, becomes discoverable by the AMF 317 when a UE or other device tries to access a service type served by the SMF 318. The NRF 312 broadcasts available services once they are registered in the 5G core. To use other network functions, registered functions can send service requests to the NRF 312.

The UDM 314 interfaces with NFs such as AMF 317 and SMF 318 so that relevant data becomes available to AMF 317 and SMF 318. The UDM 314 generates authentication vectors when requested by the AUSF 319, which acts as an authentication server. The AMF 317 performs the role of access point to the 5G core, thereby terminating RAN control plane and UE traffic originating on either the N1 or N2 reference interface. In the 5G core, the functionality of the 4G Mobility Management Entity (MME) is decomposed into the AMF 317 and the SMF 318. The AMF 317 receives all connection and session related information from the UE using N1 and N2 interfaces, and is responsible for handling connection and mobility management tasks.

The UDR 320 may provide unified data storage accessible to both control plane NFs (e.g., the functions 310-319) and user plane NFs (e.g., the UPF 321). Thus, the UDR 320 may be a repository shared between control plane NFs 310-319 and the UPF 321. The UDR 320 may include information about subscribers, application-specific data, and policy data. The UDR 320 can store structured data that can be exposed to an NF.

The UPF 321 may perform operations including, but not limited to, packet routing and forwarding, packet inspection, policy enforcement for the user plane, Quality-of-Service (QoS) handling, etc. When compared with 4G EPC, the functions of the UPF 321 may resemble those of the SGW-U (Serving Gateway User Plane function) and PGW-U (PDN Gateway User Plane function).

Returning to FIG. 2, the access node 250 is a dual-capable (in other words, it implements the components of both FIG. 3A and FIG. 3B to provide coverage in two RATs) node, and is illustrated as having a first coverage area 251 (e.g., corresponding to a first RAT) and a second coverage area 252 (e.g., corresponding to a second RAT). In one example, the first RAT is LTE and the second RAT is NR. In another example, the first RAT is NR and the second RAT is LTE. Each of the wireless devices 260 are present or may become present in one or both of the first coverage area 251 and the second coverage area 252. While the first coverage area 251 and the second coverage area 252 are illustrated as nearly congruent for purposes of illustration and explanation, in some implementations the first coverage area 251 and the second coverage area 252 may be entirely congruent, or may have different sizes and/or directional characteristics. The access node 250 may provide additional coverage areas corresponding to different RATs (such as 2G, 3G, and/or IoT RATs), different frequency bands, and the like.

The access node 250 can be any network node configured to provide communications between the wireless devices 260 and the communication network infrastructure 210, including standard access nodes and/or short range, lower power, small access nodes. As examples of a standard access node, the access node 250 may be a macrocell access node, a base transceiver station, a radio base station, a gNodeB in 5G networks, an eNodeB in 4G/LTE networks, or the like, including combinations thereof. In one particular example, the access node 250 may be a macrocell access node in which a respective range of the first coverage area 251 and/or the second coverage area 252 is from approximately five to thirty-five kilometers (km) and in which the output power is in the tens of watts (W). As examples of a small access node, the access node 250 may be a microcell access node, a picocell access node, a femtocell access node, or the like, including a home gNodeB or a home eNodeB.

In the illustration of FIG. 2, all five wireless devices 260-1 to 260-5 are illustrated as being in both the first coverage area 251 and the second coverage area 252 (also referred to as a "common coverage area") and are illustrated as actively connected to the access node 250. In practical implementations, additional wireless devices may intermittently become introduced into the system 200 (e.g., by powering on, entering the coverage area(s) from other locations, waking from a sleep mode, etc.) and/or may leave the system 200 (e.g., by powering off, leaving the cover area(s), entering the sleep mode, etc.). In accordance with various aspects of the present disclosure, the access node 250 may monitor utilization characteristics of the system 200 and dynamically adjust the resources allocated to the different RATs as will be described in more detail below. One or more of the wireless devices 260 may be dual-capable.

A scheduling entity may be located within the access node 250 and/or the controller node 303, and may be configured to allocate resources and RATs to improve overall network resource utilization and performance. This may be accomplished by, for example, assigning or allocating one or more of the wireless devices 260 to particular resource blocks and/or by assigning or allocating particular resource blocks to the first RAT or the second RAT. For example, if the utilization of a portion of spectrum in the system is greater than a predetermined threshold, the scheduling entity may determine that certain resource blocks should be allocated to communication in only one RAT or should be allocated to spectrum sharing for multiple RATs, or that wireless devices joining the system 200 should communicate using particular portions of the spectrum, as will be discussed in more detail below.

The access node 250 can comprise one or more processors and associated circuitry to execute or direct the execution of computer-readable instructions such as those described herein. In so doing, the access node 250 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the access node 250 can receive instructions and other input at a user interface.

Figure 4:
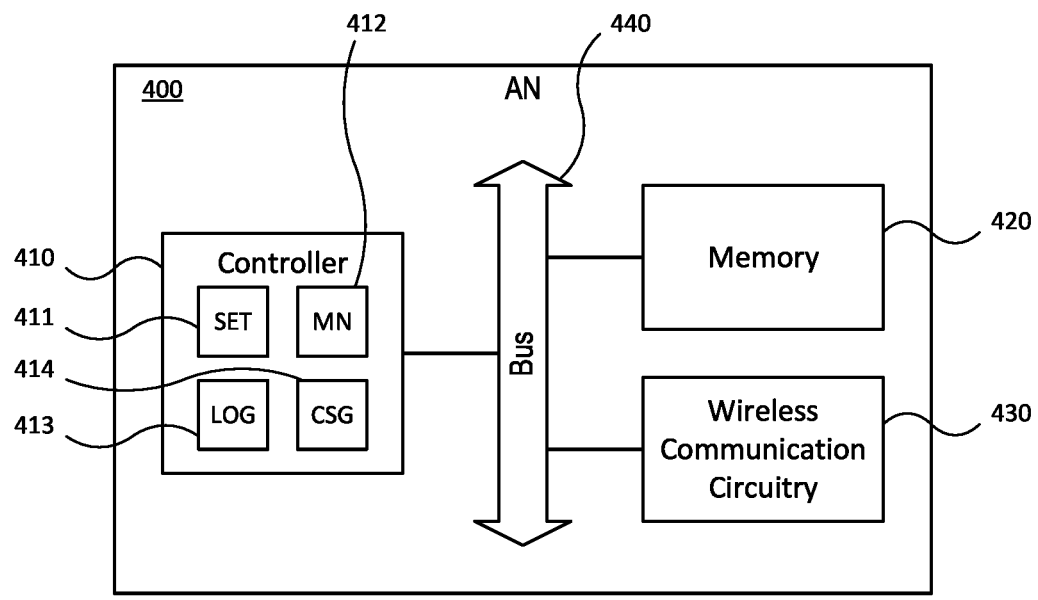
FIG. 4 illustrates an exemplary access node according to various aspects of the present disclosure.

FIG. 4 illustrates one example of an access node 400, which may correspond to one or more of the access nodes 130 shown in FIG. 1, the access node 250 shown in FIG. 2, and/or the access node 305 shown in FIG. 3A. As illustrated the access node 400 includes a controller 410, a memory 420, wireless communication circuitry 430, and a bus 440 through which the various elements of the access node 400 communicate with one another. As illustrated, the controller 410 includes sub-modules or units, each of which may be implemented via dedicated hardware (e.g., circuitry), software modules which are loaded from the memory 420 and processed by the controller 410, firmware, and the like, or combinations thereof.

Thus, the access node 400 may implement a system and/or method to dynamically resize portions of spectrum in the network and/or dynamically manage spectrum utilization wireless devices seeking to join a network associated with the access node 400. In one example as illustrated in FIG. 4, the controller 410 includes a setting unit 411, which may be configured to set at least one utilization threshold for the access node 400; a monitoring unit 412, which may be configured to monitor at least one utilization parameter of the access node 400 corresponding to at least one portion of a band with which the access node 400 may communicate; a logic unit 413, which may be configured to compare the utilization parameter(s) to the utilization threshold(s); and a control signal generation unit 414, which may be configured to generate control signals to provide functionality based on the comparison by the logic unit 413.

The functionality provided by the access node 400 (e.g., using the control signals generated by the control signal generation unit 414) may relate to spectrum and/or device management of the network within which the access node 400 resides. For example, the access node 400 may be configured to communicate using a band consisting of a first portion corresponding to communication in the first RAT and the second RAT (i.e., a DSS portion) and a second portion corresponding to communication in the first RAT but not the second RAT (i.e. a dedicated portion).

Figure 5:
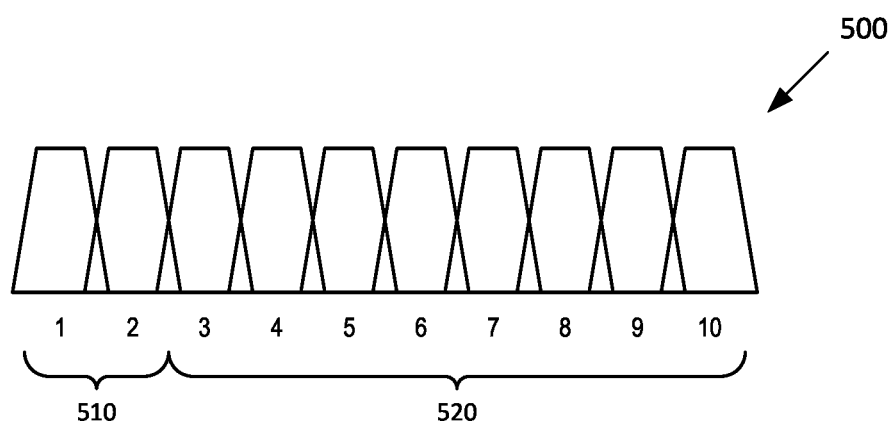
FIG. 5 illustrates exemplary spectrum blocks according to various aspects of the present disclosure.

FIG. 5 illustrates an exemplary band with which the access node communicates. FIG. 5 illustrates a band 500 of spectrum containing a first portion 510 (as illustrated, two blocks) and a second portion 520 (as illustrated, eight blocks). While FIG. 5 illustrates the first portion 510 and the second portion 520 as unitary portions composed of contiguous blocks, the present disclosure is not so limited and the first portion 510 and/or the second portion 520 may instead be composed of non-contiguous blocks. In one example, the band 500 has an overall bandwidth of ten blocks (100 MHz) and each block has a predetermined width of 10 MHz. In other examples, the band 500 may have an overall bandwidth of at least two blocks and each block may have a predetermined width of 5 MHz. The first portion 510 corresponds to shared (DSS) bandwidth, and is shared with users of both the first RAT and the second RAT. The second portion 520 corresponds to dedicated bandwidth provided only for users of the first RAT. However, in some implementations the first portion 510 may correspond to the dedicated bandwidth and the second portion 520 may correspond to the shared bandwidth. Generally, the first RAT is provided with dedicated spectrum because it has a larger user base. For example, where the first RAT is LTE and the second RAT is NR, LTE is provided with dedicated spectrum (the second portion 520) because there are many more LTE devices than NR devices at the time of the present disclosure.

However, the respective sizes of the user bases for both RATs will change over time as users adopt different technologies, replace older devices, move, and so on. If NR traffic usage (for example) gradually increases, NR traffic may become congested within the 20 MHz of shared bandwidth assigned to the first portion 510 while the 80 MHz of dedicated LTE bandwidth assigned to the second portion 520 becomes underutilized. Similarly, if NR traffic usage remains low (e.g., users in a particular area do not adopt NR devices), LTE traffic may become congested within the 80 MHz of dedicated LTE bandwidth assigned to the second portion 520 while the 20 MHz of shared bandwidth assigned to the first portion 510 is underutilized.

To prevent these and other utilization inefficiencies, the access node 400 may be configured to manage the spectrum and/or the devices connected to the access node 400. In one example, where the logic unit 413 determines that a utilization parameter for the first portion 510 exceeds a first utilization threshold and that a utilization parameter for the second portion 520 does not exceed a second utilization threshold (e.g., only one RAT is subject to heavy traffic), the access node 400 may be configured to increase or decrease a size of the first portion 510 and to decrease or increase a size of the second portion 520 by a corresponding (i.e., equal) amount. This may be accomplished by designating or reassigning a block of the first portion 510 to the second portion 520, or vice versa.

In another example, the access node 400 may be configured to receive a join request from a wireless device (e.g., one of the wireless devices 140 shown in FIG. 1 and/or the wireless devices 260 shown in FIG. 2) seeking to join the network. The join request may be received via the wireless communication circuitry 430. The access node 400 may be configured to determine a capability of the wireless device (e.g., whether the wireless device is dual-capable, a traffic type for the wireless device, etc.). The determination may be performed via the logic unit 413. Where the logic unit 413 determines that the wireless device is dual-capable or the traffic type is LTE traffic, the access node 400 may be configured to assign the wireless device to communicate with the access node using the second portion 520. The assignment may be performed in addition to or instead of the reallocation of blocks between the first portion 510 and the second portion 520.

In FIG. 4, the setting unit 411, the monitoring unit 412, the logic unit 413, and the control signal generation unit 414 are illustrated as residing within the controller 410 for ease of explanation; however, one or more of the units may instead reside within the memory 420 and/or may be provided as separate units within the access node 400. Moreover, while the setting unit 411, the monitoring unit 412, the logic unit 413, and the control signal generation unit 414 are illustrated as separate units, in practical implementations some or all of the units may be combined and/or share components.

The wireless communication circuitry 430 may include circuit elements configured to generate wireless signals (e.g., one or more antennas) as well as interface elements configured, for example, to translate control signals from the controller 410 into data signals for wireless output. While FIG. 4 illustrates the wireless communication circuitry 430 as a unitary element, some or all of the components may be divided among several distinct sets of wireless communication circuitry. The access node 400 may include additional wireless communication circuitry elements, for example to communicate using RATs other than the first communication mode and the second communication mode. The access node 400 may be configured to transmit commands via the wireless communication circuitry 430. For example, the access node 400 may be configured to transmit a network command to a wireless device (e.g., to the wireless devices 140 or 260), thereby causing the wireless device to join the network in a particular portion of spectrum.

Returning to FIG. 2, the wireless devices 260 may respectively be any device, system, combination of devices, or other such communication platform capable of communicating wirelessly with access node 250 using one or more frequency bands deployed therefrom; for example, a DSS band, a dedicated LTE band, and/or a dedicated NR band. The wireless devices 260 may respectively be, for example and without limitation, a mobile phone, a wireless phone, a wireless modem, a personal digital assistant (PDA), a voice over internet protocol (VoIP) phone, a voice over packet (VoP) phone, a voice over new radio (VoNR) device, a soft phone, a sensor, a meter, a tracking device, or other types of devices or systems which can exchange audio or data via the access node 250.

Other network elements may be present in system 200 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between the access nodes 250 and communication network infrastructure 210.

Figure 6:
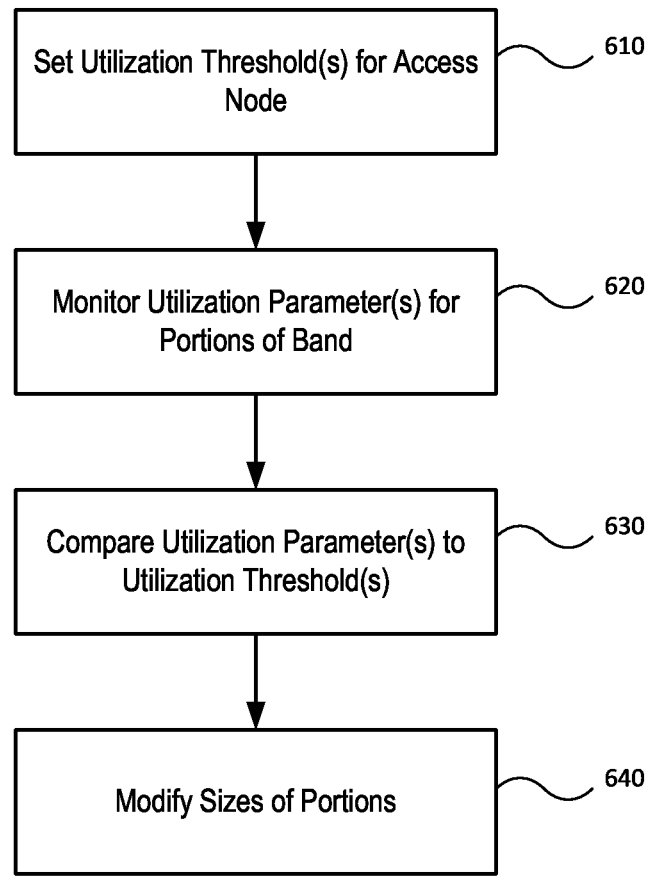
FIGS. 6-8 respectively illustrate exemplary methods according to various aspects of the present disclosure.

Devices or systems in accordance with various aspects of the present disclosure may perform various operations to dynamically reallocate blocks of spectrum and/or to dynamically assign devices to portions of spectrum. Exemplary methods including these operations are illustrated in FIGS. 6-8. The methods of FIGS. 6-8 may be triggered by various events, and in some examples may be performed continually at predetermined intervals and/or in response to network utilization characteristics or changes. The methods of FIGS. 6-8 may be performed by, for example, the scheduling entity described above. For purposes of explanation, the methods of FIGS. 6-8 will be described as being performed in the access node 400 and with regard to the band 500 and/or the wireless devices 260; however, this is merely exemplary and not limiting. Where applicable, the operations described with regard to FIGS. 6-8 assume that the wireless devices 260 are in the common coverage area of the first communication mode and the second communication mode (e.g., as illustrated in FIG. 2).

FIG. 6 illustrates an exemplary method which may be performed to dynamically accommodate network utilization. At operation 610, the access node 400 sets one or more utilization thresholds. In one example, this may include setting a first utilization threshold corresponding to a first portion of a band (e.g., the first portion 510) and setting a second utilization threshold corresponding to a second portion of the band (e.g., the second portion 520). In another example, this may include setting one utilization threshold that corresponds to each portion of the band. In yet another example, this may include setting one utilization threshold for only one portion of the band. The utilization threshold(s) may refer to a usage value above which the network is deemed to be exhibiting undesirable traffic characteristics (e.g., severe congestion). The utilization threshold(s) may be predetermined by a network operator, or may be determined in response to a network status. In one particular example, the utilization threshold(s) correspond to usage of 80% of the available bandwidth of a band or portion of the band.

At operation 620, the access node 400 monitors one or more utilization parameter corresponding to one or more of the portions of the band. For example, the access node 400 may monitor a first utilization parameter for the first portion and a second utilization parameter for the second portion. However, the access node 400 may instead monitor a utilization parameter for only the first portion. The utilization parameter may be or relate to an instantaneous usage, a historical usage, an expected usage, and the like. The utilization parameter may be predetermined by a network operator.

At operation 630, the access node 400 compares the monitored utilization parameter(s) to the utilization threshold(s). This may include comparing the first utilization parameter to the first utilization threshold and comparing the second utilization parameter to the second utilization threshold; where a common utilization threshold is used, comparing the first and second utilization parameters to the common utilization threshold; or where a single utilization parameter is monitored, comparing the utilization parameter to the utilization threshold. Based on the comparison, at operation 640 the access node 400 modifies the respective sizes (i.e., widths) of the first and second portions. Two examples of operation 640 are illustrated in FIGS. 7A and 7B.

Figure 7A:
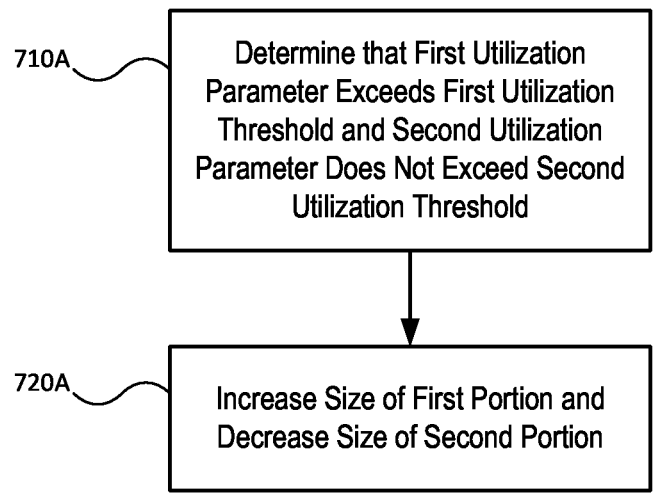

In the example of FIG. 7A, at operation 710A it is determined that the first utilization parameter exceeds the first utilization threshold and the second utilization parameter does not exceed the second utilization threshold (i.e., if the DSS portion is congested but the dedicated portion is not). Thus, at operation 720A the access node 400 increases the size of the first portion and decrease the size of the second portion by an equal amount. In the example of FIG. 7B, however, at operation 710B it is determined that the first utilization parameter does not exceed the first utilization threshold and the second utilization parameter exceeds the second utilization threshold (i.e., if the DSS portion is not congested but the dedicated portion is). In this example, at operation 720B the access node 400 decreases the size of the first portion and increase the size of the second portion by an equal amount. Modifying the sizes of the first and second portion by an equal amount ensures that the total bandwidth of the band (e.g., the band 500) remains unchanged. The amount by which the first and second portions are modified may be a whole number of blocks, including one block.

The operations of FIG. 6 are not necessarily performed in a strict series from operation 610 to operation 640. In some implementations, the access node 400 may perform operation 610 once for a given period of time, perform operations 620 and 630 repeatedly or continuously until a utilization parameter exceeds a utilization threshold, and then perform operation 640 thereafter. The trigger for operations 620 and/or 630 may include the passage of a predetermined amount of time, receipt of a join request from a wireless device, a determination that the wireless device is dual-capable, and the like. After the portions of the band have been appropriately modified (e.g., operation 640 has occurred), the access node may return to operation 620 without resetting the utilization usage threshold.

Figure 7B:
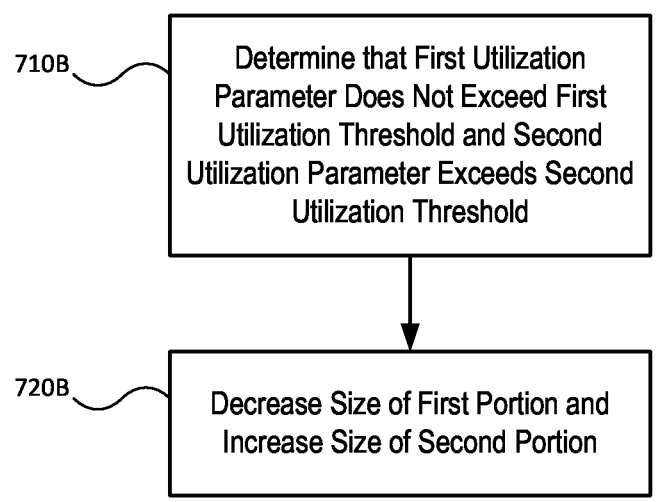
Figure 8:
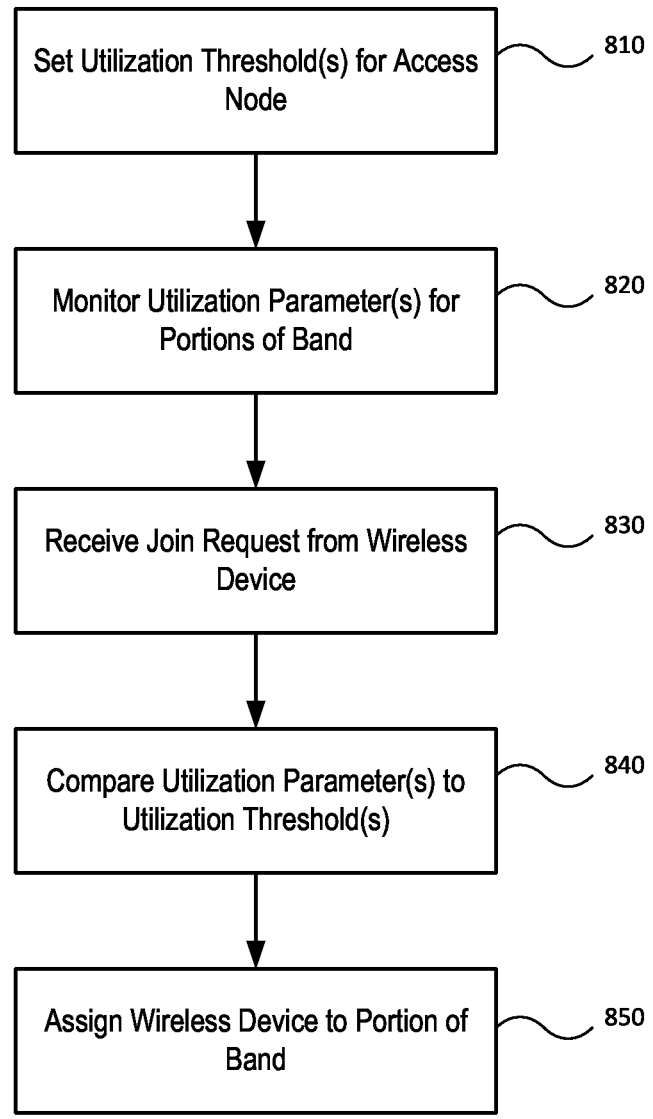

While FIGS. 6-7B illustrate an example where the spectrum is managed by reallocating blocks between the DSS portion and the dedicated portion, the present disclosure is not so limited. Additionally or alternatively, the spectrum may be managed by dynamically assigning wireless devices to particular portions of the spectrum. FIG. 8 illustrates one such example, where a dual-capable wireless device may be assigned to a particular portion of the band (e.g., the dedicated portion) even though it is capable of communicating in the other portion of the band.

At operation 810, the access node 400 sets one or more utilization thresholds. In one example, this may include setting one utilization threshold for only one portion of the band (e.g., only for the first portion 510). In another example, this may include setting one utilization threshold that corresponds to each portion of the band. In yet another example, this may include setting a first utilization threshold corresponding to a first portion of a band (e.g., the first portion 510) and setting a second utilization threshold corresponding to a second portion of the band (e.g., the second portion 520). The utilization threshold(s) may refer to a usage value above which the network is deemed to be exhibiting undesirable traffic characteristics (e.g., severe congestion). The utilization threshold(s) may be predetermined by a network operator, or may be determined in response to a network status. In one particular example, the utilization threshold(s) correspond to usage of 80% of the available bandwidth of a band or portion of the band.

At operation 820, the access node 400 monitors one or more utilization parameter corresponding to one or more of the portions of the band. For example, the access node 400 may monitor a utilization parameter for only the first portion. However, the access node 400 may instead monitor a first utilization parameter for the first portion and a second utilization parameter for the second portion. The utilization parameter may be or relate to an instantaneous usage, a historical usage, an expected usage, and the like. The utilization parameter may be predetermined by a network operator.

At operation 830, the access node 400 receives a join request from a wireless device (e.g., one of the wireless devices 260 illustrated in FIG. 2). The join request may include a capability report, by which the wireless device indicates that it is dual-capable. At operation 840, the access node 400 compares the monitored utilization parameter(s) to the utilization threshold(s). This may include comparing the first utilization parameter to the first utilization threshold and comparing the second utilization parameter to the second utilization threshold; where a common utilization threshold is used, comparing the first and second utilization parameters to the common utilization threshold; or where a single utilization parameter is monitored, comparing the utilization parameter to the utilization threshold. Based on the comparison, at operation 850 the access node 400 assigns the wireless device to either the first portion of the band or the second portion of the band, as appropriate.

For example, if at operation 840 the access node determines that the utilization parameter for the DSS portion exceeds the corresponding utilization threshold (i.e., if the DSS portion is congested), then the access node 400 may assign the wireless device to the dedicated portion even though it would be capable of communicating using the DSS portion. Alternatively, if at operation 840 the access node determines that the utilization parameter for the DSS portion does not exceed the corresponding utilization threshold (i.e., if the DSS portion is not congested), then the access node 400 may assign the wireless device to the DSS portion even though it would be capable of communicating using the dedicated portion.

The operations of FIG. 8 are not necessarily performed in a strict series from operation 810 to operation 850. In some implementations, the order of operations 820 and 830 may be transposed, such that operation 820 does not occur until triggered by the receipt of a join request from a wireless device. In such implementations, operation 820 may further require a determination that the wireless device is dual-capable before being triggered. After the wireless device has been appropriately assigned (e.g., operation 850 has occurred), the access node may return to operation 820 without resetting the utilization usage threshold.

While the preceding examples have been presented in the context of a spectrum which includes only two portions, the present disclosure may be extended to a spectrum which includes three portions. For example, the present disclosure may be implemented with a spectrum that include a DSS portion available for communication in two different RATs (e.g., LTE and NR), a first dedicated portion available for communication in one of the RATs (e.g., LTE), and a second dedicated portion available for communication in the other of the RATs (e.g., NR). In other implementations, more than two RATs and/or more than three portions of spectrum may be used.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of managing network bandwidth, comprising:
    setting a first utilization threshold and a second utilization threshold for an access node, wherein the access node is configured to communicate using a band that includes a plurality of shared resource blocks for communication using both of a first radio access technology (RAT) and a second RAT, and a plurality of dedicated resource blocks for communication using one of the first RAT or the second RAT;
    monitoring a utilization parameter for the band;
    comparing the utilization parameter to a utilization threshold; and
    in response to a determination that the utilization parameter exceeds the utilization threshold, modifying a number of the plurality of shared resource blocks and modifying a number of the dedicated resource blocks.

2. The method according to claim 1, wherein modifying the number of the plurality of shared resource blocks includes increasing the number of the plurality of shared resource blocks, and wherein modifying the number of the plurality of dedicated resource blocks includes decreasing the number of the plurality of dedicated resource blocks.

3. The method according to claim 1, wherein the band includes at least two total resource blocks each having a size of 5 MHz or 10 MHz.

4. The method according to claim 1, wherein an initial number of the plurality of shared resource blocks is at least one.

5. The method according to claim 1, wherein the utilization parameter corresponds to an amount of traffic in one of the first RAT or the second RAT.

6. The method according to claim 1, wherein the first RAT is one of a Long Term Evolution (LTE) RAT or a New Radio (NR) RAT, and the second RAT is the other of the LTE RAT or the NR RAT.

7. The method according to claim 1, wherein the plurality of shared resource blocks form a Dynamic Spectrum Sharing (DSS) bandwidth.

8. A system for managing network bandwidth, comprising:
    an access node configured to provide communication services using a band that includes a first portion corresponding to both of a first radio access technology (RAT) and a second RAT and a second portion corresponding to only the first RAT; and
    at least one electronic processor configured to perform operations including:
        monitoring a utilization parameter for the first RAT,
        comparing the utilization parameter to a utilization threshold, and
        based on the comparing, modifying a resource allocation of the first portion and a size of the second portion.

9. The system according to claim 8, wherein the modifying includes switching at least one resource block within the band from the first portion to the second portion.

10. The system according to claim 8, wherein
    before the modifying, a size of the band is 100 MHz, the size of the first portion is 20 MHZ, and the size of the second portion is 80 MHZ, and
    after the modifying, the size of the band is 100 MHZ, the size of the first portion is greater than 20 MHZ, and the size of the second portion is less than 80 MHz.

11. The system according to claim 8, wherein the utilization parameter corresponds to a degree of congestion for connected wireless devices using the first RAT.

12. The system according to claim 8, wherein the utilization parameter corresponds to a degree of congestion for connected wireless devices using the second RAT.

13. The system according to claim 8, wherein the operations of the at least one electronic processor further include:
receiving a join request from a wireless device;
determining a capability of the wireless device; and
in response to a determination that the utilization parameter exceeds the utilization threshold and a determination that the wireless device is capable of communicating in both of the first RAT and the second RAT, assigning the wireless device to communicate with the access node using the second portion.

14. The system according to claim 8, wherein the operations of the at least one electronic processor further include:
receiving a join request from a wireless device, wherein the wireless device is capable of communicating using both of the first RAT and the second RAT;
determining a historical usage parameter of the wireless device in the first communication mode;
based on the historical usage parameter, assigning the wireless device to communication with the access node using the second RAT.

15. The system according to claim 8, wherein the first RAT is one of a Long Term Evolution (LTE) RAT or a New Radio (NR) RAT, and the second RAT is the other of the LTE RAT or the NR RAT.

16. A non-transitory computer-readable medium storing instructions that, when executed by a processor of a processing node in a telecommunication network, cause the processing node to perform operations comprising:
providing telecommunication services over a frequency band that includes a first set of resources corresponding to communication in a first radio access technology (RAT) and a second RAT and a second set of resources corresponding to communication in the first RAT but not the second RAT;
monitoring a utilization parameter for the first set of resources and/or the second set of resources;
comparing the utilization parameter to a utilization threshold; and
in response to a determination that the utilization parameter exceeds the utilization threshold, switching at least one resource block from the second set of resources to the first set of resources.

17. The non-transitory computer-readable medium according to claim 16, further comprising:
in response to a determination that the utilization parameter no longer exceeds the utilization threshold, switching the at least one resource block from the first set of resources back to the second set of resources.

18. The non-transitory computer-readable medium according to claim 16, wherein the utilization threshold is predetermined by a network operator.

19. The non-transitory computer-readable medium according to claim 16, wherein the first RAT and the second RAT are different 3rd Generation Partnership Project (3GPP) RATs.

20. The non-transitory computer-readable medium according to claim 16, wherein the first set of resources utilize a Dynamic Spectrum Sharing (DSS) technology.

* * * * *